United States Patent

[11] 3,571,657

| [72] | Inventor | Helmut Domann<br>Stuttgart, Germany |
|---|---|---|
| [21] | Appl. No. | 791,090 |
| [22] | Filed | Jan. 14, 1969 |
| [45] | Patented | Mar. 23, 1971 |
| [73] | Assignee | Robert Bosch G.m.b.H.<br>Stuttgart, Germany |
| [32] | Priority | Mar. 7, 1968 |
| [33] | | Germany |
| [31] | | P 16 13 993.8 |

[54] ELECTRICAL POWER SUPPLY SYSTEM FOR AUTOMOTIVE VEHICLES AND PARTICULARLY POLYPHASE BRIDGE-TYPE RECTIFIER THEREFOR
7 Claims, 10 Drawing Figs.

[52] U.S. Cl.................................................. 317/13,
317/31, 317/33, 322/28, 322/36
[51] Int. Cl...................................................... H02p 7/06,
H02p 9/30
[50] Field of Search........................................... 317/13, 31,
33 (VR); 322/28, 36, 73; 310/68 (C), 68 (D)

[56] References Cited
UNITED STATES PATENTS

| 3,402,325 | 9/1968 | Minks......................... | 317/31X |
| 3,469,168 | 9/1969 | Harland, Jr. et al. ......... | 317/31X |
| 3,480,832 | 11/1969 | Person.......................... | 317/31X |

*Primary Examiner*—Oris L. Rader
*Assistant Examiner*—H. Huberfeld
*Attorney*—Flynn and Frishauf ABSTRACT: To prevent transient overvoltages in automotive-type power supply systems using three-phase alternators and full wave rectifiers connected thereto, at least one of the rectifier pairs connected to an output winding of the alternator uses breakdown-type power rectifier diodes having a breakdown voltage at least 5 percent above the nominal voltage set by the voltage regulator of the system. Connection of breakdown diodes to further, or preferably all phases provides still better protection at greater expense, however.

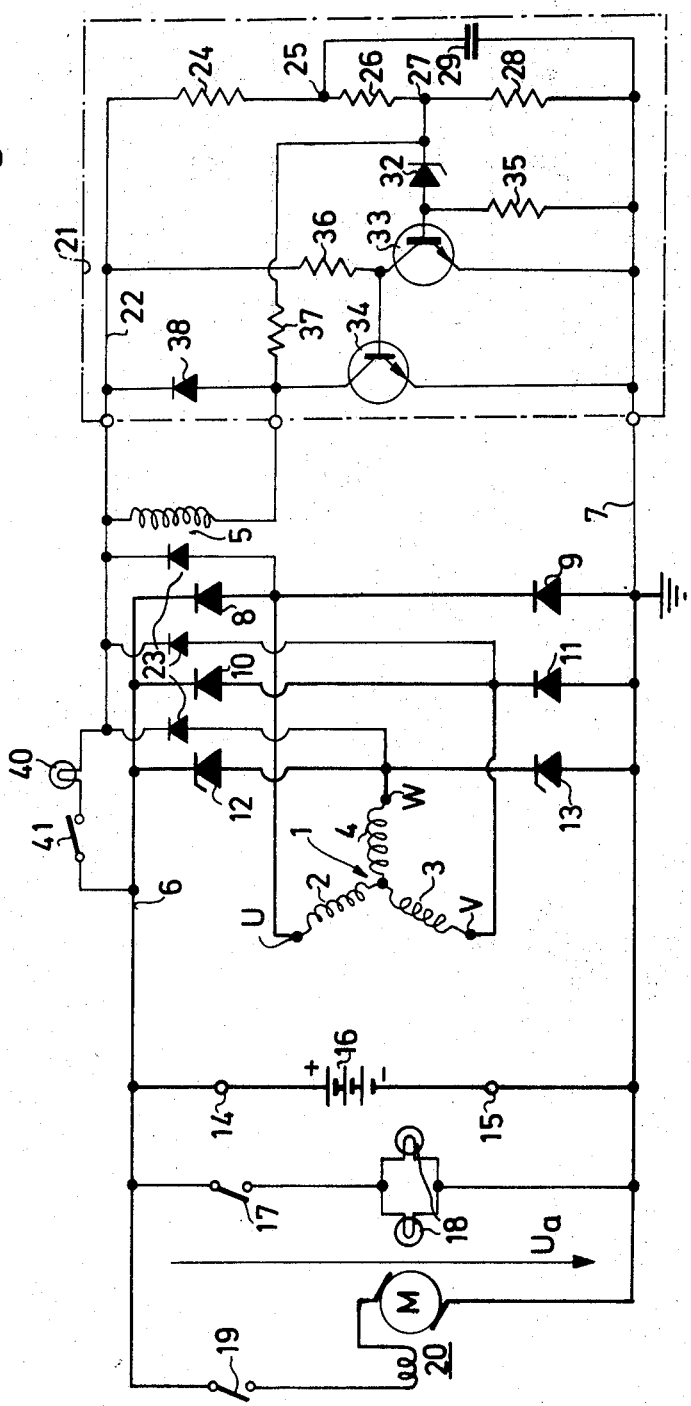

INVENTOR.
Helmut DOMANN

ELECTRICAL POWER SUPPLY SYSTEM FOR AUTOMOTIVE VEHICLES AND PARTICULARLY POLYPHASE BRIDGE-TYPE RECTIFIER THEREFOR

The present invention relates to electrical power supply systems for automotive vehicles, and more particularly to such systems utilizing a three-phase alternator having a field winding connected to a semiconductor voltage regulator, the output voltage of the three-phase alternator being rectified by a full wave three-phase bridge rectifier connected to each phase of the alternator.

Alternators of this type are commonly used in vehicles since they supply power even at low rotational speed, so that they are particularly suitable for use in start-and-stop urban traffic. Solid state semiconductor voltage regulators have a satisfactory operating life and provide for effective voltage control; they do, however, require that a battery be always connected between the positive and negative outputs of the power supply system. This battery, acting like a large condenser, holds the direct current voltage between the positive and negative bus at a substantially constant value. If this battery is not properly connected, however, it is possible that the semiconductor voltage regulator and, possibly, further additional loads may be destroyed due to overvoltages, unless special protective measures are taken. One proposed protective measure is the parallel connection of a Zener diode to the semiconductor voltage regulator. Such Zener diode becomes conductive if an overvoltage is sensed and thus limits the voltage at the semiconductor voltage regulator to a safe value. Such Zener diode must, however, be capable of carrying substantial energy since sudden disconnection of a load drawing a substantial amount of power may cause the generator voltage to rise to several hundred volts, even if only for a short period of time. The energy suddenly to be absorbed may be several hundred Watt-seconds. A Zener diode capable of carrying such energy thus must be, itself, of high power rating and is very costly.

It is an object of the present invention to provide an electrical power supply system for vehicles, and particularly using three-phase alternators which may be operated even without a battery and which are not substantially more expensive than heretofore known systems.

SUBJECT MATTER OF THE PRESENT INVENTION

Briefly, the rectifier is so constructed that the power rectifier elements connected to at least one of the phases themselves are of the breakdown type, that is have themselves the characteristics of Zener diodes. This arrangement has plural advantages: overvoltage conditions which may be due to loads connected to the electrical system will cause breakdown of the two rectifying elements, so that the elements themselves will limit externally caused overvoltages. Further, the elements will limit induced overvoltages in two of the three phase windings of the three-phase alternator to reasonable values. Overvoltages at the third phase are not completely limited; they arise only during a fraction of each phase, however, and can be limited by means of a filter condenser or the like.

The rectifying elements having the breakdown characteristics, during normal operation, serve as power rectifier elements without breakdown; thus, their normal power carrying capacity should be sufficiently high to be suitable for normal design load. Since they normally carry power current, they must also be suitably cooled. They are thus well suited to accept short-time transient overloads. The breakdown voltage of the elements is preferably set to a value which is at least 5 percent higher than the normal controlled voltage set by the voltage regulator.

Although slightly more costly, in a preferred form four rectifier elements of a 6-element bridge-type rectifier have voltage breakdown characteristics. During each period of the three-phase voltage swing, the loading will thus change several times between the various elements having the breakdown characteristics so that the loading is distributed over several elements which, by themselves, are thus less subject to peak overloads.

The invention will now be described by way of example with reference to the accompanying drawings, wherein:

FIG. 1 is a general circuit diagram of a three-phase alternator in a three-phase bridge-type rectifier network together with a semiconductor voltage regulator, as connected into a load circuit;

Figure 2A:
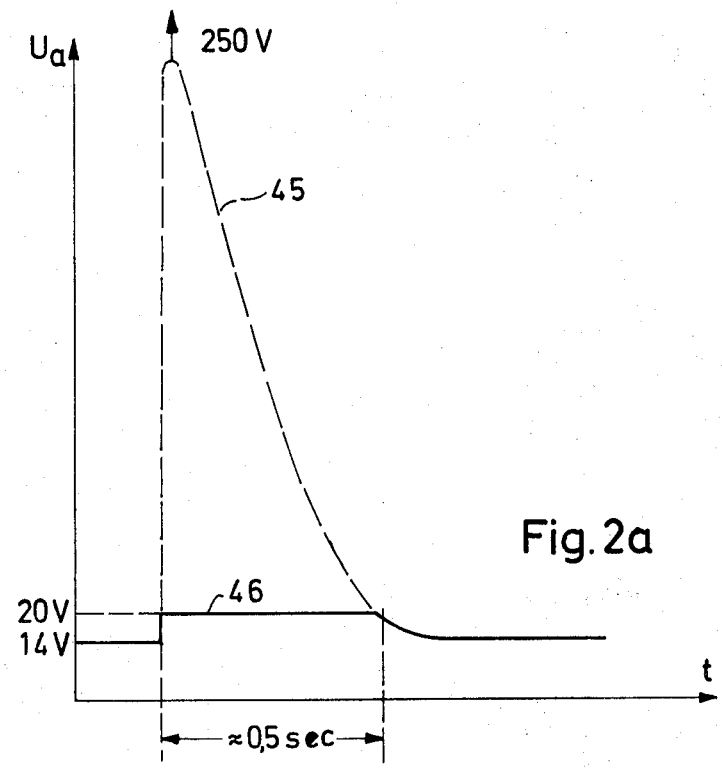
FIGS. 2a and 2b are graphs with respect to time of voltage, and power, respectively, useful in an understanding of the operation of the invention.

A three-phase alternator 1 has three star connected phase windings 2, 3, 4, with output terminals U, V and W. The alternator 1 has a rotating field 5 which, when energized, induces three alternating voltages shifted by 120° with respect to each other. The voltage within the windings will depend on the current in the field winding 5.

Each of the phase terminals U, V, W is connected over a rectifying element, each, with a positive bus 6 and a negative bus 7, connected to chassis. Phases U and V are connected to the usual silicon diodes 8, 9, and 10, 11, respectively. Phase W, however, is connected to a pair of rectifying elements 12, 13, which are of the breakdown type, that is which are of the Zener diode type. The rectifier elements 8 to 13 together form a three-phase bridge-type rectifier network which is the rectifier for the power current delivered by the generator 1 and supplies a battery 16 over terminals 14 and 15, as well as, for example, headlights 18 over a switch 17 and other loads such as an inductive load 20, connected over a switch 19, which may, for example, be the starter motor of a vehicle.

The three phases U, V, W are further connected over three rectifier elements 23 with an auxiliary bus 22. Rectifier elements 23, together with the three rectifier elements 9, 11, 13 form a second three-phase bridge-type rectifier to supply direct current to the field winding 5 and further to a solid state semiconductor voltage regulator 21 which controls the current flowing through field winding 5. Auxiliary bus 22 is the positive terminal and bus 7 the negative terminal for the field and the voltage regulator. The voltage between buses 6 and 7 is approximately the same as that between buses 22 and 7, connected to voltage regulator 21. Regulator 21 therefore controls indirectly the output voltage between buses 6 and 7 by controlling the voltage between lines 22 and 7.

The regulator 21 itself includes a resistance 24 connected to bus 22 which, together with resistances 26 and 28 forms a voltage divider. Junction point 25 between resistances 24 and 26 is connected to a smoothing condenser 29 which filters high frequency voltage ripples between buses 22 and 7. The cathode of a Zener diode 32 is connected to junction 27 between resistances 26, 28 of the voltage divider. The anode of Zener diode 32 is connected to the base of a NPN control transistor 33, the emitter of which is connected directly to chassis. A second NPN transistor 34 likewise has its emitter connected directly to chassis. A resistance 35 interconnects the base of transistor 33 and bus 7, that is chassis. The collector of transistor 33 is connected directly to the base of transistor 34 and, over a resistance 36 with auxiliary bus 22. The collector of transistor 34 is connected to one terminal of the field winding 5 and over a feedback resistance 37 with the tap or junction point 27 of the voltage divider. The other terminal of field winding 5 is connected to auxiliary bus 22. A diode 38 is connected in parallel to field winding 5.

An ignition switch 41, in series with a charge indicator light 40 is connected between positive bus 6 and auxiliary bus 22.

Operation of voltage regulator 21: If the output voltage of generator 1 is too low, the voltage at tap 27 will be so low that Zener diode 32 will block, and transistor 33 will not receive base current, so that transistor 33 likewise will block. Its collector will then be positive with respect to bus 7, so that base current will flow in transistor 34, which will become conductive and current will flow through field winding 5. This will cause an increase in the output voltage of generator 1. The collector of transistor 34 will then approximately have the potential of negative bus 7 so that resistance 37 will in effect be connected in parallel between junction 27 and chassis. The voltage across the resistance portion 28 of the voltage divider formed of resistances 24, 26, 28 will thus decrease and the transistor 33 as well as Zener diode will remain blocked. As the output voltage of generator 1 increases, the voltage of junction 27 will likewise increase and will eventually become sufficiently positive so that Zener diode 32 will become conductive and transistor 33 will likewise become conductive. This causes a rapid increase in its collector current, decreasing the base current of transistor 34. This causes an increase in collector voltage of transistor 34 which will quickly reach the voltage of bus 22. Resistance 37 will now act as if it would be connected in parallel between junction 27 and bus 22. As a result, the voltage of tap 27 will increase again, for example by 0.2 V. This increase will cause Zener diode 32 to become fully conductive, transistor 33 will receive its full base current and likewise will become fully conductive, causing transistor 34 to block completely. Resistance 37 thus acts as a feedback resistance, in a "bootstrap" circuit, causing rapid switching of transistor 34 between its blocked and fully conductive states. This permits a substantially higher loading of transistor 34 since its losses are only small when it is either fully conductive or completely blocked.

Blocking of transistor 34 causes a drop in the flow of current through winding 5. This current continues to flow through diode 38, decreasing exponentially. The voltage of generator 1 will therefore drop.

The back-and-forth switching will continue at a frequency of from 10 to 100 Hz., keeping the output voltage of generator 1 essentially constant under steady state conditions, that is under conditions in which the loading is substantially even. This is particularly true when battery 16 is connected since it acts, electrically, like a large condenser substantially smoothing voltage variations.

If switch 19 is operated to start the starter motor 20, an overvoltage is induced in buses 6, 7 due to the inductivity of the starter motor. The negative half wave (bus 6 negative, but 7 positive) of such induced voltage is short circuited by rectifier elements 8 to 10. The positive half wave of the induced voltage (bus 6 may, instantaneously, become more positive than bus 7 by 50 V) is limited by the two rectifier elements 12, 13 which become conductive even in their blocking condition by breaking down. If voltage regulator 21 is set to keep the voltage constant at, for example, 14 V, then the rectifier elements 12 and 13 are preferably selected to have a breakdown voltage of between 17 to 18 V. The voltage between the buses 6 and 7 is then limited to approximately 38 V by the rectifier elements 12 and 13 which is still a safe voltage for the semiconductor voltage regulator 21.

Figure 2B:
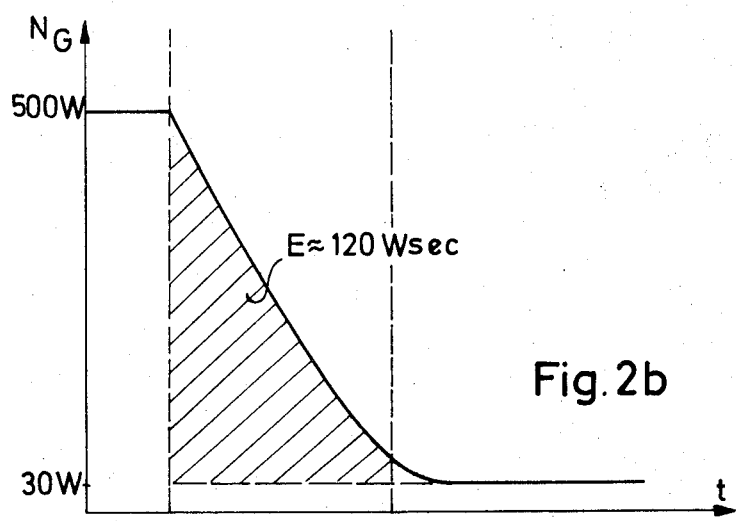

The output voltage $U_a$ of generator 1, and thus also the voltage between buses 6 and 7, or 22 and 7, respectively, will increase rapidly when a load 18 or 20 is suddenly disconnected if battery 16 is removed, or one of the battery terminals 14 or 15 is improperly connected. FIG. 2a illustrates a graph of such a transient voltage rise 45 of output voltage $U_a$ which can be brought back by voltage regulator 21 to the normal voltage only after about 0.5 sec. The transient voltage may rise suddenly from 14 V to 250 V, as seen in FIG. 2a if, for example, a heavy load is suddenly disconnected, for example if in a vehicle all normal loads (headlights, interior lights, heater, radio etc.) are disconnected simultaneously. Such a transient voltage rise normally causes destruction of the semiconductor voltage regulator 21 and therefore, ordinarily, use of semiconductor voltage regulators in a vehicle electrical system requires connection of a battery. The cause of the voltage rise is due to the presence of diode 38. Under normal loading, for example with an output of the generator 1 of 500 W, current within field winding 5 will be 2 A. If the load is disconnected, this current will continue to flow—even if only for a short period of time—in field winding 5 over diode 38, even if transistor 34 is already blocked. The high field then induces very high output voltages in the now unloaded phase windings 2, 3, 4, providing substantial energy, as seen in FIG. 2b. This energy may well exceed 100 Watt seconds. For comparison, the ignition spark of a spark plug normally provides an energy of only 0.01 to 0.05 Watt seconds. Normally, this nondissipated energy causes destruction of transistor 33 and/or transistor 34.

The rectifier diodes 12, 13 having breakdown characteristics can limit the voltage peaks to a safe value, as seen in FIG. 2a at curve 46, in heavy lines.

Figure 3A:
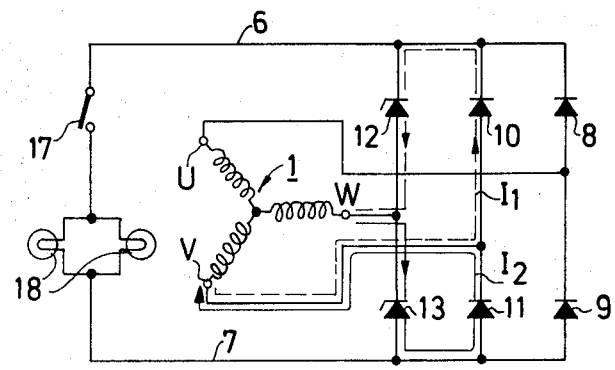
FIGS. 3a and 3b are partial circuit diagrams illustrating current flow.
Figure 3B:
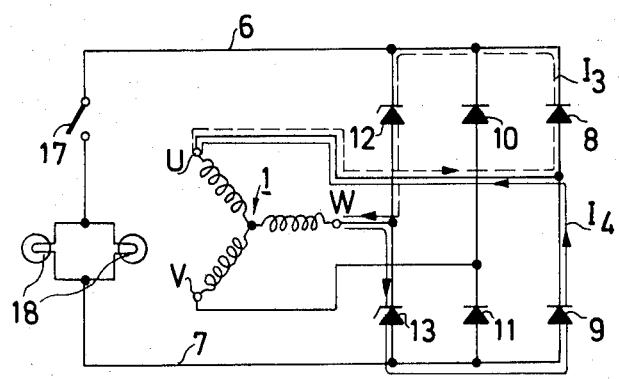

The limiting action of the breakdown-type diodes 12, 13 is best explained with reference to FIGS. 3a and 3b, in which the currents in the diodes 12, 13 are shown, under overvoltage condition. FIGS. 3a and 3b are partial views of the circuit of FIG. 1 and illustrate the currents for different points of time shortly after opening of switch 17 disconnecting a large number of loads 18. It is also assumed that after switch 17 is opened, there are no further loads connected to the generator system and that battery 16 is disconnected.

As discussed above, the output voltage of generator 1 will rise suddenly as soon as switch 17 is opened. FIG. 3a illustrates the currents which result between the phases V and W when such overvoltage conditions arise. If phase V is positive with respect to phase W, then current $I_1$ will flow (in FIG. 3a shown in broken lines): from phase V over rectifier element 10 to the cathode of rectifier element 12 which, as soon as the voltage exceeds a predetermined value, for example 18 V, breaks down and becomes conductive; and then to the anode of rectifier element 12 and back to phase W. This voltage is thus limited to approximately 19 V. If phase W is positive with respect to phase V, then current $I_2$ will flow (in FIG. 3a in solid line): from phase W to the cathode of rectifier element 13 which breaks down and becomes conductive, and from its anode over rectifier 11 back to phase V. This voltage is also limited to approximately 19 V—the exact limiting value depending on the breakdown voltage of element 13.

FIG. 3b illustrates currents for the instant of time when a voltage transient occurs between phases U and W. If phase U is positive with respect to W, then current $I_3$ will flow (broken line): from phase U over elements 8 and 12 to phase W. If, reversely, phase W is positive with respect to phase U, current $I_4$ will flow (solid lines): from phase W over element 13 and element 9 to phase U. As seen, the voltage between phase W and phase U is also limited to approximately 19 V. The voltage between phases U and V is, in the circuit in accordance with FIG. 1, indirectly limited by limiting the voltage of the other phases since the phase windings of generator 1 will generate at least one of the currents $I_1$ to $I_4$ and will thus all be loaded.

Figure 4:
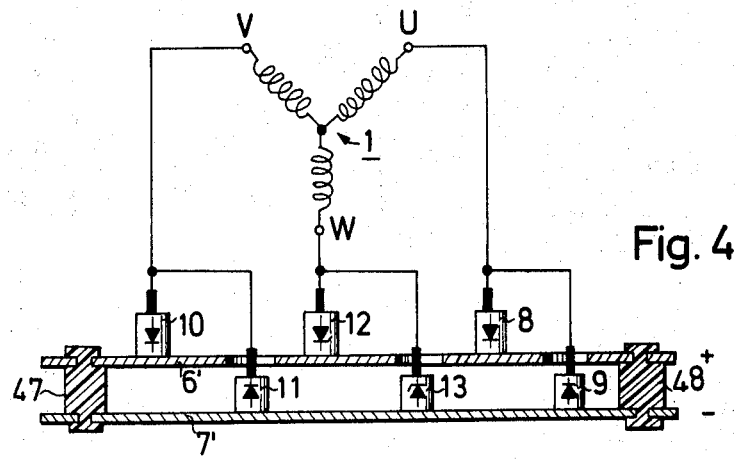
FIG. 4 is a schematic diagram illustrating a cooling arrangement.

The breakdown diode elements 12, 13 are heavily loaded when overvoltage conditions occur. They thus require exceptionally good cooling, and special heat sinks or cooling fins with suitable heat capacity are required. One of the customary rectifier constructions provides a common cooling fin and heat sink for three rectifier elements, arranged substantially in line, which common cooling fin furthermore serves as a common support as well as a current conductor. In order to provide for extra cooling capacity for the two breakdown elements 12 and 13, they are located centrally of the cooling and support plate, as best seen in FIG. 4. A pair of cooling fins 6' (for positive polarity) and 7' (for negative polarity) are separated by insulating separators 47, 48; elements 8, 10, 12 are located on plate 6', and elements 9, 11, 13 on plate 7', with elements 12 and 13 being located in the middle, so that heat therefrom may dissipate in both directions. Since overloads are transient and occur only during short periods of time, such an arrangement has been found sufficient to cool the breakdown units.

Figure 5A:
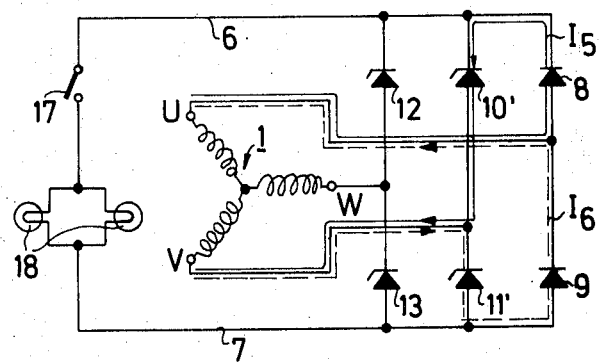
FIGS. 5a, 5b and 5c are partial circuit diagrams illustrating current distribution in a modified form of the invention, for various instants of time.
Figure 5B:
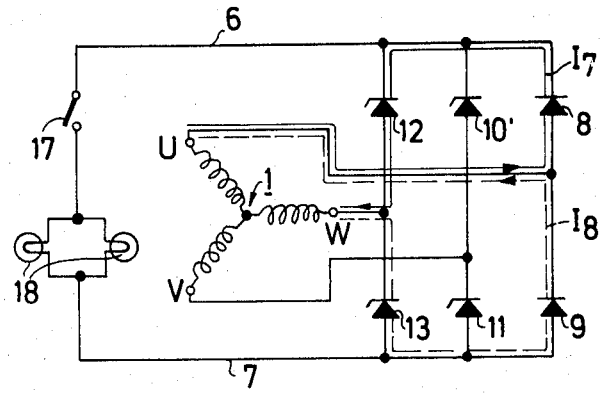
Figure 5C:
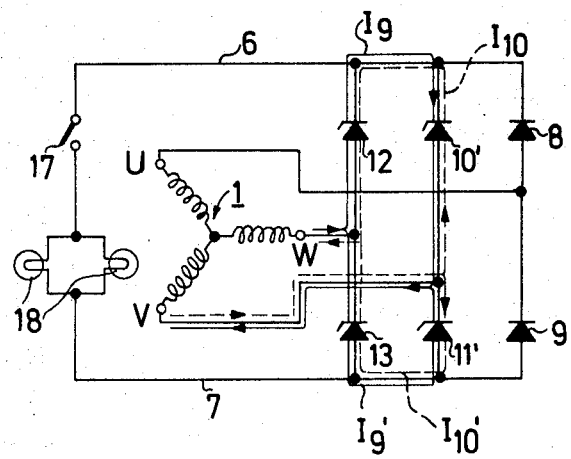

FIGS. 5a to 5c illustrate a modified embodiment in which four rectifying elements with breakdown characteristics are used in the bridge-type three-phase rectifier. The distribution of these four elements among the total of six rectifier elements of the three-phase bridge rectifier may be at random, but due to the cooling requirements the circuits illustrated in FIGS. 5a—5c have been found particularly suitable, as will be discussed in detail below.

The circuit according to FIGS. 5a—5c differs from that of FIG. 1 only in that the rectifying elements 10 and 11 of FIG. 1 are replaced by breakdown-type rectifier diodes 10′, 11′. FIG. 5a illustrates the current distribution when overvoltage conditions exist between phases U and V. If phase V is positive with respect to phase U, current $I_5$ will flow from V over elements 8 and 10′ to phase U, element 10′ breaking down. If, however, phase U is positive with respect to phase V, current $I_6$ will flow from phase U over elements 9 and 11′—with element 11′ breaking down—to phase V. In both cases there is limitation of the voltage to the breakdown voltage of elements 10′ and 11′ respectively.

FIG. 5b illustrates currents for the case that overvoltage exists between phases U and W. If phase U is positive with respect to phase W, current $I_7$ will flow from U over elements 8 and 12 to W. If, reversely, W is positive with respect to U, current $I_8$ will flow from W over elements 13 and 9 to U. Currents $I_7$ and $I_8$ will limit the voltage between U and W likewise to the breakdown voltage of elements 12 and 13.

FIG. 5c illustrates currents if overvoltage exists between phases V and W. If W is positive with respect to V, two currents $I_9$ and $I_{9'}$ will flow between W and V: current $I_9$ will flow from W over elements 12 and 10′ to V and current $I_{9'}$ will flow from phase W over elements 11′ and 13 to V. If, conversely, V is positive with respect to W, two currents $I_{10}$ and $I_{10'}$ will flow between V and W: current $I_{10}$ will flow from V over elements 12 and 10′ to W and current $I_{10'}$ will flow from V over elements 11′ and 13 to W. Currents $I_9$, $I_{9'}$ and $I_{10}$, $I_{10'}$ respectively, are equal in magnitude and thus load elements 10′, 11′, 12 and 13 equally so that the energy to be dissipated is distributed over four rectifying elements whereas the energy to be dissipated in the cases discussed in connection with FIGS. 5a and 5b is distributed only over two elements. If the elements 8 and 9 are additionally formed as Zener diode rectifiers, then in all instances, that is even in the overvoltage conditions discussed in connection with FIGS. 5a and 5b the energy will be distributed over four diodes. In each instance, the separate diodes 10′, 11′ and 12 and 13 are not loaded continuously, but only with interruptions so that only a portion of the energy to be dissipated is applied to any one of the diodes.

Figure 6:
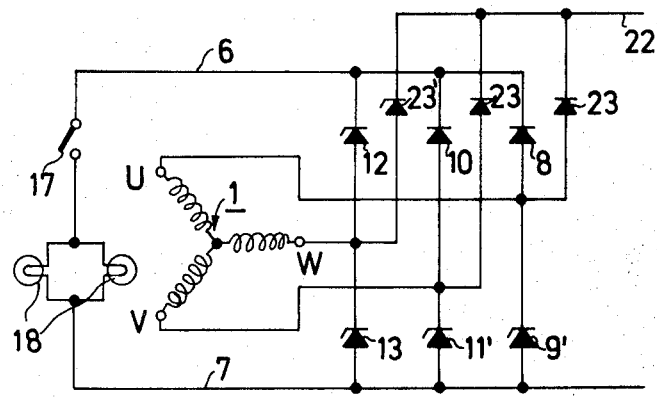
FIG. 6 is a partial circuit diagram of another embodiment of the present invention.

The auxiliary rectifier group 23 may also contain one or more elements having breakdown characteristics; FIG. 6 illustrates a circuit in which the left element 23′ is a Zener-type rectifier diode, similar to the types of elements 9′, 11′, 12 and 13 of the load current rectifier. Upon overvoltage conditions, element 23′ will be, electrically, in parallel to element 12 and will thus provide for additional relief from loading. Further, elements 23′ and 13 together will limit the voltage transients between buses 22 and 7. The breakdown voltage of element 23 is, preferably, selected to be somewhat higher than that of element 13.

All of the rectifier elements used in the circuit of FIG. 6 may be of the type having breakdown characteristics. This is, however, not absolutely necessary and is not always desired since such elements are more expensive than ordinary rectifier diodes, particularly silicon diodes.

The separate rectifier elements in the circuit of FIG. 6 are preferably so arranged on their support and cooling plates (compare, for example, plate 6′ and 7′ in FIG. 4) that all of the breakdown-type diodes are particularly well cooled. Thus, a cooling plate carrying three elements 9′, 11′ and 13 will be heated much more than a cooling plate carrying elements 8, 10 and 12. Therefore, the circuit of the rectifier in accordance with FIGS. 5a to 5c is preferred since the heat to be dissipated can be evenly distributed over both cooling plates.

The circuit in accordance with the present invention has been found to substantially improve the quality of voltage regulation in steady state operation without battery. It is believed that this is due to decrease of the voltage peaks occurring during commutation of current between the various rectifiers 8 to 13 of the power rectifier group. A generator designed for a 12 volt, nominal, output may have voltage peaks up to 40 V, which peaks interfere with proper function of the voltage regulator 21. The circuit in accordance with the present invention limits these voltage peaks to a substantially lower value, for example approximately 18 V, which no longer interferes with regulator effectiveness.

The present invention has been described in connection with an automotive-type electrical power supply system for use with a 12 volt three-phase alternator; various modifications and changes may be made within the inventive concept.

I claim:

1. Polyphase bridge-type rectifier for connection to an automotive-type polyphase alternator of a predetermined nominal output voltage and, having a semiconductor rectifier element, each, adapted for connection to a phase output winding (U, V, W) of the alternator on one side and to an output bus (6, 7) of the rectifier, respectively on the other, and heat dissipating means mounting said rectifier element and formed of heat sink plates (6′, 7′), wherein the rectifier elements (12, 13) interconnecting at least one phase (W) of the generator and the positive (6) and negative (7) buses, respectively, and supplying rectified output power from the phase winding of the alternator are breakdown-type power rectifier diodes, having a breakdown voltage of at least 105 percent and up to 150 percent of the output voltage, the same number, or the same number plus one of the rectifying elements with breakdown characteristics being located on said heat sink plates.

2. Rectifier according to claim 1, wherein said polyphase alternator is a three-phase alternator, and said bridge-type rectifier is a three-phase full wave rectifier having six rectifying elements, wherein four of said six rectifying elements are breakdown-type power rectifier diodes adapted for connection to the outputs of the phase windings of the three-phase generator.

3. Rectifier according to claim 1, wherein the power rating of said breakdown-type rectifier diodes is greater than the power rating of the other rectifier elements to be able to dissipate increased power upon breakdown.

4. Rectifier according to claim 1, further including a separate group of additional semiconductor rectifier elements (23) adapted for connection to a field winding (5) of the alternator, characterized in that at least one of the elements (23′) of said additional group of semiconductor elements is of the breakdown-type.

5. In an electrical power supply system for automotive vehicles comprising:

a three-phase alternator having three-phase windings and a field winding, a first group of power rectifier elements connected for full wave rectification to each of the phase windings of said alternator and providing rectified DC output at a pair of output buses, said buses being adapted for connection to a load;

a second group of rectifier elements connected to each of the phase windings of said alternator and providing auxiliary rectified DC output;

a solid state voltage regulator connected to said auxiliary rectified DC output and interconnecting said auxiliary output with the field winding of said alternator to maintain the output voltage constant at a predetermined value, the improvement wherein the power rectifier elements connected to at least one phase winding of the alternator are semiconductor breakdown-type diodes and have a power rating higher than the other rectifiers in the group, the breakdown voltage of said breakdown-type semiconductor rectifier diodes being at least 5 percent and up to about 50 percent higher than said predetermined voltage value, said power rectifier elements being mounted on a pair of heat-dissipating members and said breakdown-type elements being mounted at locations of maximum heat dissipation capability of said heat-dissipating members.

6. Power supply according to claim 5, wherein said heat-dissipating members include a pair of metal strips, each having three semiconductor elements mounted thereon, in line, with one of said breakdown-type diode elements being located centrally of the other elements, on each strip.

7. Power supply according to claim 5, wherein at least one of the rectifier elements in the second group of rectifier elements is of the breakdown-type and has a breakdown voltage higher than the breakdown voltage of said power rectifier breakdown-type elements of the first group.